United States Patent
Woywod et al.

(10) Patent No.: US 6,273,529 B1
(45) Date of Patent: Aug. 14, 2001

(54) METHOD AND DEVICE FOR IMPROVING THE HANDLING CHARACTERISTICS OF A VEHICLE WHILE BRAKING DURING CORNERING

(75) Inventors: Jürgen Woywod, Mörfelden; Dirk Waldbauer, Eppstein; Georg Roll, Heusenstamm, all of (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/581,979

(22) PCT Filed: Nov. 13, 1998

(86) PCT No.: PCT/EP98/07287

§ 371 Date: Aug. 10, 2000

§ 102(e) Date: Aug. 10, 2000

(87) PCT Pub. No.: WO99/32338

PCT Pub. Date: Jul. 1, 1999

(30) Foreign Application Priority Data

Dec. 20, 1997 (DE) .............................................. 197 57 014
May 6, 1998 (DE) .............................................. 198 20 107

(51) Int. Cl.⁷ .............................. B60T 8/72; B60T 8/24; B60T 8/60; B60T 8/66
(52) U.S. Cl. .......................... 303/173; 303/139; 303/147; 303/155; 303/169
(58) Field of Search .............................. 303/139, 122.01, 303/167, 169, 173, 155, 147, 176, 148, 146; 188/3 H

(56) References Cited

U.S. PATENT DOCUMENTS

| | | | |
|---|---|---|---|
| 4,852,009 | * 7/1989 | Jonner | 364/426.02 |
| 4,951,199 | * 8/1990 | Whitehead | 364/424.05 |
| 5,632,535 | * 5/1997 | Luckevich | 303/186 |
| 5,685,618 | * 11/1997 | Uchida | 303/146 |
| 5,690,083 | * 11/1997 | Gopp | 123/571 |
| 5,927,830 | * 7/1999 | Tozu | 303/155 |
| 6,012,010 | * 1/2000 | Batistic | 701/72 |

FOREIGN PATENT DOCUMENTS

0771707 * 5/1997 (EP) .

* cited by examiner

Primary Examiner—J. J. Swann
Assistant Examiner—David Devine
(74) Attorney, Agent, or Firm—Rader, Fishman & Grauer PL

(57) ABSTRACT

A system including a method for improving the driving performance of a vehicle when braking during cornering comprises the following steps: detecting cornering and the direction of cornering, determining the rolling characteristics of individual wheels, if necessary, influencing the braking pressure of the brake on one wheel or on several wheels according to the rolling characteristics of these wheels, checking the driving condition of the vehicle with respect to whether instability prevails, and modifying the braking pressure of at least one brake of a wheel when an instability is detected during a cornering maneuver extending for a time period that reaches a threshold time period. A device for improving the driving performance of a vehicle while braking during cornering comprises a detection device for detecting a cornering maneuver and the direction of cornering, a determining device for determining the rolling characteristics of individual wheels, an influencing device which optionally influences the braking pressure of the brake on one wheel, a checking device for checking the driving condition of the vehicle as to whether instability prevails, and a modifying device for modifying the braking pressure of at least one brake of a wheel when an instability is detected during cornering extending for a time period which reaches a threshold time period.

28 Claims, 6 Drawing Sheets

METHOD AND DEVICE FOR IMPROVING THE HANDLING CHARACTERISTICS OF A VEHICLE WHILE BRAKING DURING CORNERING

TECHNICAL FIELD

The present invention generally relates to vehicle stability control, and more particularly relates to a method and a device for improving the driving performance of a vehicle when braking during cornering.

BACKGROUND OF THE INVENTION

Braking during cornering poses special challenges in terms of driving dynamics because different forces (inertia force of the lurching vehicle, centrifugal force of the vehicle on a circular course) have to be accommodated, on the one hand, and the marginal conditions during which braking takes place are variable with time. The underlying problematic nature will be explained in the following with reference to FIGS. 1 and 2.

The embodiment of FIG. 1 shows a situation in which a vehicle, e.g. due to excessive speed, is unable to follow a desired ideal course 107 with a comparatively narrow bend radius because the centrifugal force which urges the vehicle out of the circular course 107 exceeds the sum of the cornering forces of the wheels. This situation in position 102 presents itself to the driver as understeering (because the desired course 107 is followed only insufficiently). Therefore, the driver tends to augment steering (major steering angle of the front wheels) which, however, causes a still more noticeable understeering behavior. This may finally lead to the fact that the vehicle itself oversteers (turns curve-inward) but moves on a remarkably understeered course 109 (positions 103 and 104). It would be desirable in this case that the vehicle follows at least the somewhat less understeering course 108 and would especially not turn inwards so that the position 106 results.

However, previous methods for braking optimization did not permit adjusting such a performance. Practically all modern vehicles are equipped with an ABS (anti-lock system), a wheel-individual control which influences the braking pressure on a wheel brake according to the rolling characteristics of the said wheel. However, this system does not permit producing torques about the vertical axis of the vehicle that act especially favorably because the wheels can only be actuated individually but not in a more comprehensive relationship.

In particular, it can be seen that ABS furthers the understeering behavior. This is because a rolling moment (about the longitudinal axis) of the vehicle is caused by the centrifugal force so that the wheels on the outside of a bend are loaded to a stronger extent and, thus, have a reduced tendency to lock. The result is that they will enter the slip range later so that a greater brake force is produced on the bend-outward wheels and a lower brake force is produced on the bend-inward wheels, and the total result is a yaw torque turning bend-outwards (about the vertical axis) of the vehicle which intensifies the understeering tendency.

An object of the present invention is to provide a method and a device for improving the driving performance of a vehicle when braking during cornering which permit a favorable assistance in braking in conformity with the respective situation.

Especially, the method and the device shall be adapted to the time-variable marginal conditions.

Preferably, implementation of the method and the device shall be simple, more particularly, without increased expenditure in sensors.

FIG. 2 shows a lane change which may be desired, for example, in case it is suddenly necessary to avoid an obstacle (child on the road). Reference numeral 214 designates the desired course, and the vehicle moves alongside the positions 201, 202, 203, and 204. Various situations are passed through consecutively. At the commencement of turning inwards, the situation explained with respect to FIG. 1 may occur (understeering due to excessive speed). Besides, the vehicle may become unstable inasfar as it turns bend-inwards on an understeering course as is shown already in FIG. 1. Thus, optimizing a steering maneuver (smallest possible bend radius to the left) was desirable in the transition from position 201 to position 202, while starting from position 202 the increase of driving stability may be desirable to prevent complete swerving of the vehicle. Because measures for increasing the steerability of a vehicle are not necessarily identical to measures for increasing the stability of the vehicle, it may consequently be desirable that other measures are taken in the transition from 202 to 203 than in the transition from 201 to 202. It is assumed in point 203 that it was possible to avoid an obstacle and steering to an offset track is now desired. A countersteering maneuver will therefore commence. Thus, steering points to a different direction than before. A priori, the same considerations as before exist in a mirror-inverted manner. Nevertheless, it should be taken into account in addition that the dynamics of the second bend (to the right in FIG. 2, transition from 203 to 204) is still influenced dynamically by the 'case history', i.e., the sudden steering to the left (transition from 201 via 202 to 203). An appropriate steering arrangement should take into account all of the above-mentioned observations.

Therefore, the present invention proposes detecting a braked cornering maneuver and structuring it with respect to time. Favorable measures are taken, as the situation may be, according to the time sequence during cornering. These measures are taken especially when instabilities become apparent such as e.g. great amounts of slip on any one or more of the wheels. When unstable braking during cornering lasts longer than a time period which reaches a threshold time period, the braking pressure on any one or more of the wheel brakes is modified with respect to optimizing the vehicle stability.

Further, steerability of the vehicle may be enhanced during unstable cornering maneuvers in the time period before the threshold time period is reached.

The various operating conditions, especially cornering maneuvers and instabilities, can be identified in an embodiment with reference to the wheel sensors and, more particularly, without the use of a steering angle sensor.

DETAILED DESCRIPTION OF THE PREFERRED EMBODIMENTS

Before individual embodiments of the present invention will be described with reference to the drawings, the terminology employed will be referred to briefly. An important aspect of this application is the control of the braking pressures in the individual wheel brakes. Different strategies are suggested, independently of each other or combined with one another. When speaking of 'influencing the braking pressure' or an 'influencing device', this refers to a wheel-individual control of the braking pressure on a wheel, such as in the way of an ABS. When speaking of 'modifying the braking pressure' or a 'modifying device', this refers to the modulation of the braking pressure with regard to stability improvement. When speaking of the 'variation of the braking pressure', this refers to the braking pressure modulation with respect to optimizing the steerability of the vehicle. When finally speaking of 'braking pressure alteration', this means the braking pressure modulation with respect to more complex operations, for example, the assistance in braking in the case of a sudden lane change. The interaction of the just mentioned strategies will now be explained in further detail.

Figure 3:
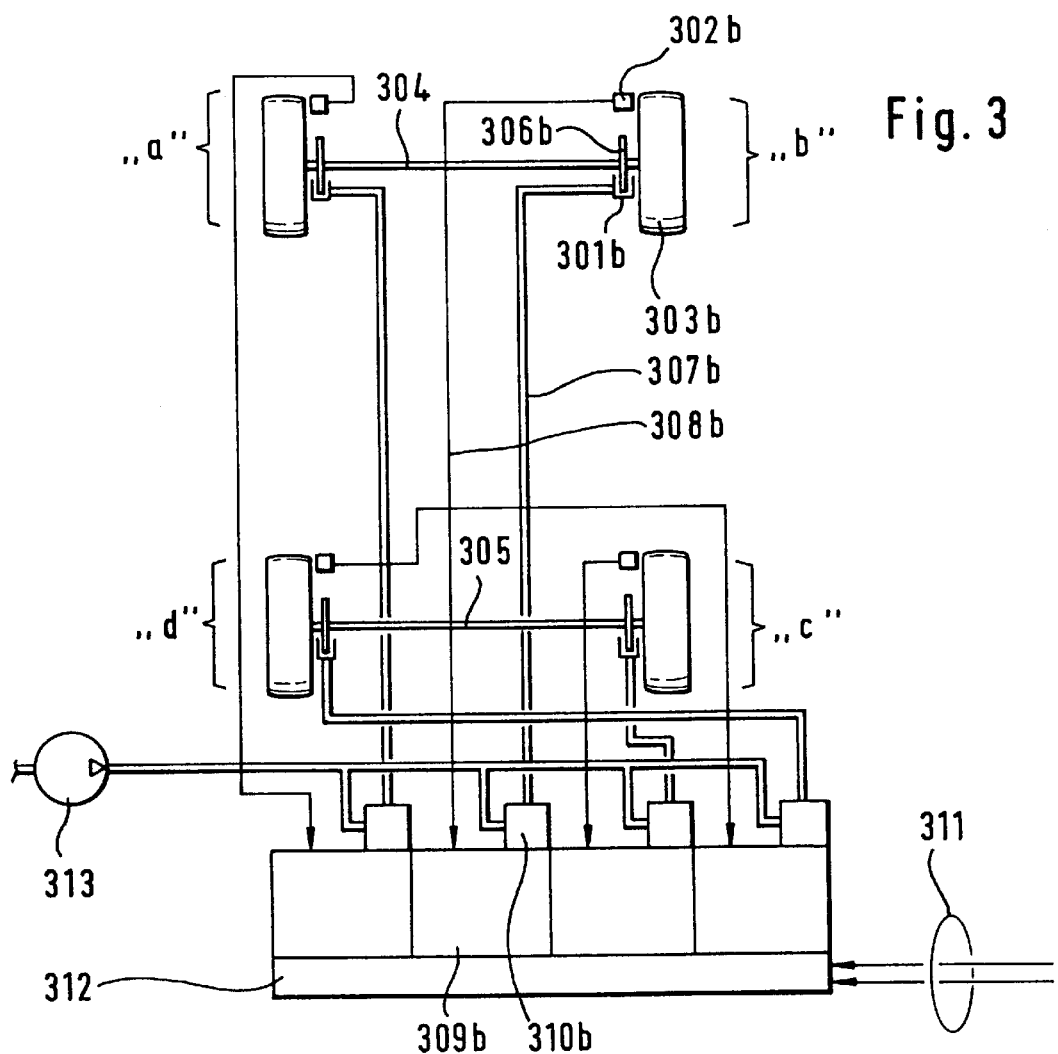
FIG. 3 is a combination of several embodiments of the present invention.
Figure 3:
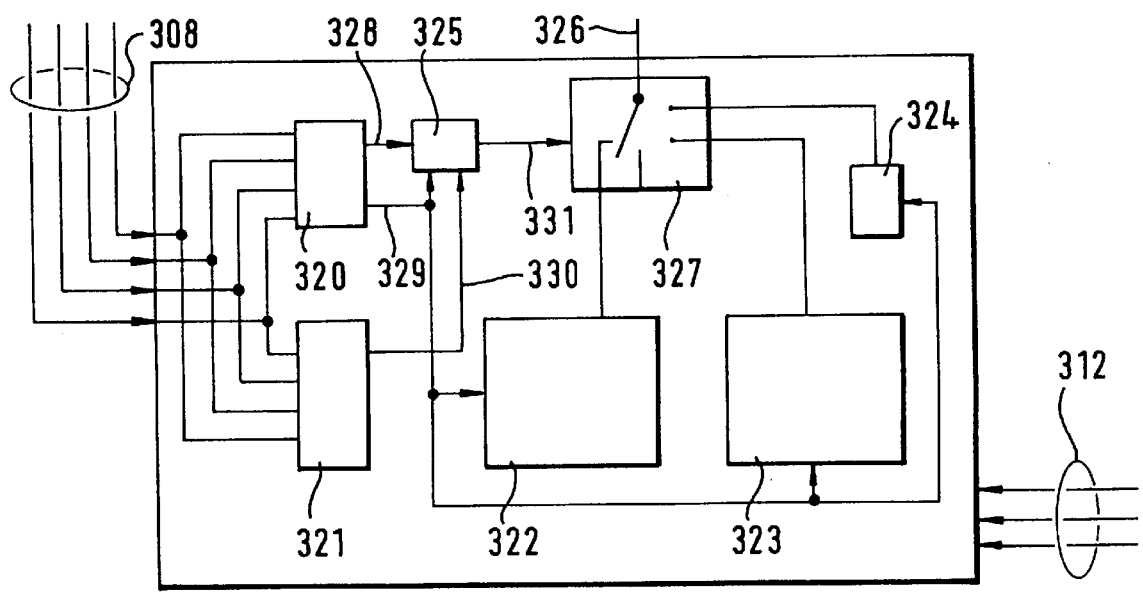

FIG. 3 shows a schematic view of several embodiments of the present invention. Four wheels 303a–d of a vehicle are shown on the top in FIG. 3. Index 'a' refers to the left front wheel, index 'b' refers to the right front wheel, index 'c' means the right rear wheel, and index 'd' is the left rear wheel. Reference numeral 304 is the front axle with the wheels 303a and 303b, 305 is the rear axle with the wheels 303c and 303d. One wheel sensor 302a–d is provided on each of the wheels 303a–d. The respective signals are sent to an electronic component 309a–d by way of signal lines 308a–d. Further, each wheel 303a–d has a wheel brake 301 a–d, 306a–d. The brakes are operated hydraulically and receive pressurized hydraulic fluid by way of hydraulic lines 307a–d. The braking pressure is adjusted by way of a valve block 310b, and the valve block 310b is driven by electric signals which are produced in the electronic circuit 309b.

The components with index 'b' described hereinabove for the right front wheel can be found similarly for the other wheels.

The component 309a–d designates influencing devices which individually adjust the braking pressure of a wheel. The rolling characteristics of a wheel by way of the signal (line 308) issued by the respective wheel sensor 302 is monitored. Actuating signals for the valves in the valve block 310 are produced according to the signal received. Locking of a wheel is thereby prevented individually on that wheel. For example, the system concerned may be an ABS.

Reference numeral 313 represents a hydraulic pump for making available hydraulic fluid under pressure. A reservoir for hydraulic fluid which accommodates the fluid that is returned is not shown.

The electronic control may have a joint component 312 which takes care of joint tasks such as receiving further input signals 311, signal conditioning, coordination, and similar tasks.

A combination of several embodiments according to the present invention is shown in the bottom part of FIG. 3.

Reference numeral 320 refers to a detection device for detecting cornering and the direction of cornering. The design of this device may be so that it detects cornering itself and the direction of cornering (for example, by way of the rolling characteristics of the individual wheels). Thus, it may e.g. receive the signals of the individual wheel sensors 302a–d by way of lines 308a–d. However, other signals which may be conditioned already, may optionally also be sent to this device. Also, the detection device 320 may be so configured that it generates two signals, i.e., one signal (328) which indicates cornering qualitatively, and another signal (329) which indicates the direction of cornering in the case of a cornering maneuver.

Further, there is provision of a checking device 321 which checks the driving condition of the vehicle as to whether an instability prevails. Because this condition, too, can be identified by way of the rolling characteristics of the wheels, this checking device can also receive the wheel signals 308.

Besides, there is provision of a device 325 which evaluates the time variation. It checks more particularly whether an unstable braked cornering maneuver lasts over a defined or definable time period which reaches a threshold time period.

Figure 1:
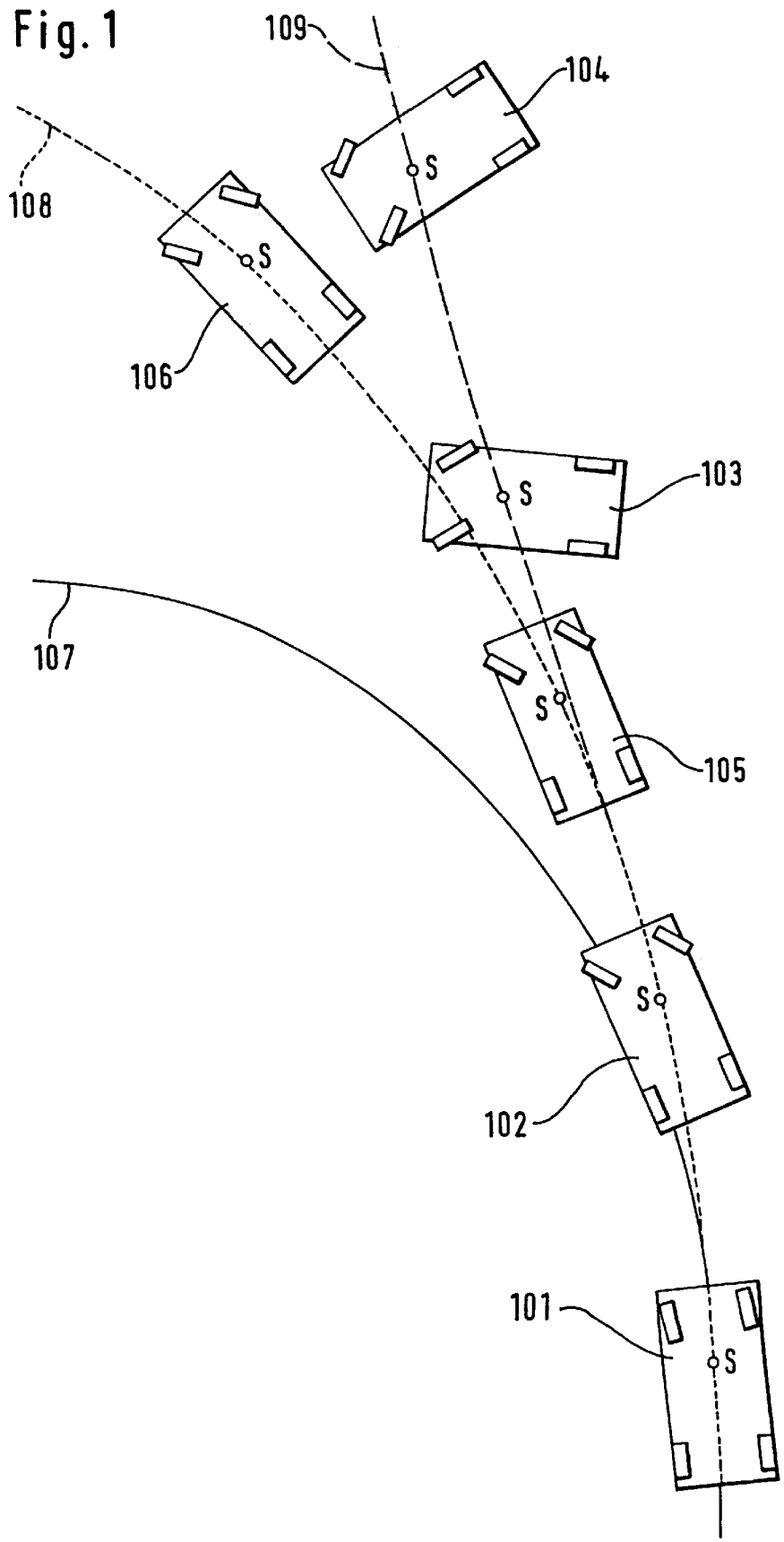
FIG. 1 is an example of an understeered unstable driving maneuver.

If this is the case, modification of braking pressure will be initiated. This modification of braking pressure is effected by orienting to stability and may especially be performed so that the braking pressure is decreased on at least one bend-inward wheel and/or increased on at least one bend-outward wheel. Preferably, the braking pressure is decreased on the inner side of the bend. The result is increased brake forces on the outside of a bend so that a bend-outwards turning yaw torque (about the vertical axis) is generated which counteracts the tendency of the vehicle to turn inwards. The result is a greater likelihood of preventing the unfavorable development in FIG. 1 from position 102 to 103, and the vehicle will probably follow a less unfavorable line 108 via positions 105 and 106.

FIG. 3 shows a modifying device designated by reference numeral 322 which is used for modifying the braking pressure to augment the vehicle stability when, during braked cornering, instability is detected over a time period which reaches the threshold time period.

In the embodiment of FIG. 3, a possible option is illustrated in such a way that a commutator 327 selects one strategy of different brake assistance strategies according to device 325. The commutator 327 receives different input signals which may concern the modification, change or alteration of the braking pressure. The then obtained signals are relayed by way of output line 326.

It is considered another option that the signals 326 do not act directly on the brakes but serve for changing the threshold values taken into account for influencing the braking pressure. For example, the ABS threshold values can be modified by the modifying device 322. Line 326 may contain several parallel signal lines. The commutator 327 may include a neutral position in which no signals are issued by way of line 326.

In another embodiment, the braking pressure on one or more of the wheels can be changed before the modification of the braking pressure of the brake of one or more of the wheels.

This is done prior to the expire of the mentioned threshold time period. Until attainment of this threshold time period, the commutator 327, controlled by device 325, may again select the output of a changing device 323. The changing device 323 causes changes in braking pressure which support the steerability of a vehicle. Especially, as has been mentioned hereinabove, it is possible to counteract the bend-outwards turning yaw torque (about the vertical axis) which is produced by the ABS so that the vehicle is forced to follow a narrower course (course 108 instead of course 109 in FIG. 1). More particularly, the braking pressure can be decreased on the outside of a bend. In addition or instead, the braking pressure can optionally be increased on the inside of a bend.

Thus, a braking maneuver in a bend can consist of three phases in total:
1. Deceleration-optimized braking under ABS (in FIG. 1 until position 101) by wheel-individual influencing of the braking pressures on the individual wheel brakes.
2. Steering-optimized braking pressure change in a time period before the expire of a threshold time period (for example, until point 105 in FIG. 1) by braking pressure decrease outwards.
3. Stability-optimized braking pressure modification starting from the attainment of the threshold time period, for example by braking pressure decrease on the bend-inward side or on the rear axle (starting from position 105 in FIG. 1) in order to prevent swerving of the vehicle.

The measures discussed under points 2. and 3. are taken when an unstable vehicle behavior becomes apparent. When this is not apparent, pure ABS braking can be continued. Whether an independently distinguishable phase of a pure ABS braking according to point 1 above becomes apparent depends on whether or how fast the driving condition of the vehicle is identified as unstable in the checking operation. When instability is detected at once, it is possible (as has been mentioned above) to initially change the braking pressure in a steering-optimized manner, and thereafter the braking pressure can be modified in a stability-oriented manner.

A steering-optimized braking pressure change can also be effected by a change in the ABS threshold values.

Basic braking pressure modifications to increase the driving stability in a bend comprise individually or in combination the sensitive braking of the bend-inward front wheel (low braking pressure) and the intense braking of the bend-outward front wheel (with a high braking pressure). Further measures are e.g. the omission of the select-low principle, according to which the lower of the two braking pressures which otherwise result on the rear axle is selected. Rather, a slight pressure rise on the bend-outward rear wheel is brought about.

The two front wheels can be controlled sensitively (lower braking pressure) to increase steerability.

Because both the modifying device 322 and the changing device 323 take direction responsive measures, they receive the signal 329 from the detection device 320 which indicates the direction of the bend (left/right) in the embodiment shown. The device 325 can also receive the direction signal 329 beside the qualitative signal 328 (bend yes/no) for an embodiment described hereinbelow. The signal 330 of the checking device 321 indicates that braking in the unstable condition prevails. Signal 330 is used for the control of the commutator 327. Reference numeral 324 designates an alteration device whose operation will be explained later.

The devices described with reference to FIG. 3, bottom half, may receive further signals 312, for example, the vehicle reference speed, a value referring to the coefficient of friction (between wheel and road surface), and similar values.

An embodiment of the determining device 325 is shown above all in FIG. 4. Among others, the determining device receives the qualitative bend signal 328, the direction signal 329, the signal 330 indicative of instability, and a signal 402 indicative of the ABS control cycles. The determining device 325 may have a counter 401 which can be so configured, for example, that it permits detecting when the threshold time period for left-hand and right-hand bends is reached. For example, the counter may be an upward/downward counter which counts around a fixed counter reading according to the bend direction signal 329.

The counter reading on line 421 is compared with threshold values 406, 407 which are grouped around the fixed counter reading. Consequently, counter 401 receives the qualitative bend signal 328 and the signal 330 indicative of instability as qualitative 'enable' signals. When their values indicate an unstable bend, the counter will count the ABS cycles on line 402 according to the bend direction signal 329 starting from the last prevailing counter reading, for example, the fixed counter reading. Preferably, the fixed counter reading is zero, one threshold value is lower than zero and the other threshold value exceeds zero. One of each of the values is stored in the comparison device 406 or 407. The values may be present in a fixed form, or they may be variable again, for example, according to the coefficient of friction (the lower the coefficient of friction, the closer the value is to the fixed counter reading).

In the comparators 406, 407, the counter reading on the possibly multiwire line 421 is compared with the respective threshold values. Thus, the threshold time period can be determined by appropriately setting the thresholds/counter readings in the comparators 406, 407. In a coordination device 410, the outputs of the comparators 406, 407 are coordinated to a signal which expediently actuates the commutator 327 or generally triggers the appropriate brake assistance strategy.

Counter 401 may be so configured that it can be counted upwards or downwards until limit values are reached, and the top limit value is above the top threshold value, and the bottom limit value is below the bottom threshold value. Further, the counter can be rated so that in case unstable braking during a cornering maneuver no longer prevails (for example, there is only braking in a bend, but stable), the counter reading is restored in steps to the fixed counter reading.

The result is a decay function which implies that when previously (due to exceeding of the top or the bottom limit value) the stability-oriented braking pressure modification had been switched on, this modification will have a slight aftereffect. The duration of this aftereffect depends on the difference between the limit value and the threshold value. Upon further return of the counter to the fixed counter reading, both comparators 406, 407 will no longer respond, and the commutator may e.g. be set to a steering-optimizing position or neutral position (deceleration-optimized, for example, ABS).

Figure 2:
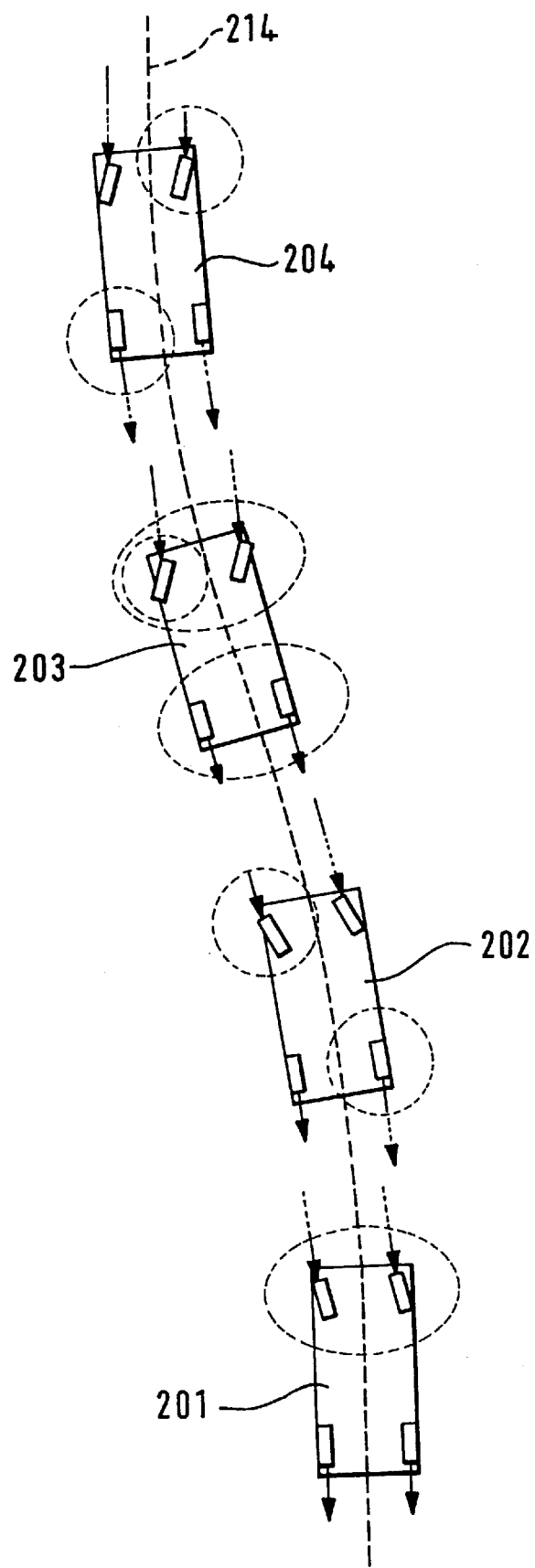
FIG. 2 is an example of a lane change.

The situation of a lane change corresponding to FIG. 2 is examined hereinbelow. The lane change is characterized by the quick steering in one direction being followed by a sudden countersteering in the other direction. It is principally possible in this case to take the same measures as in the first steering operation in a mirror-inverted manner. Only the outside and inside of the bend are exchanged. Preferably, it must be ensured that initially a phase of steering optimizing and thereafter a phase of stability optimizing will follow one after the other during countersteering operations. Taking the embodiment of counter 402 which has already been described, this may take place in that the counter, upon detection of countersteering, is reset faster than before (in larger steps) or instantaneously to the fixed counter reading. The same method as before will follow (upward counting of the counter in the other direction until the respectively other comparator 406, 407 responds). Before one of the comparators responds, the commutator can be actuated to select the steering-optimizing braking pressure change. After the other threshold value has been exceeded, the stability-oriented braking pressure modification will be selected again. Thus, a lane change, as shown in FIG. 2, is composed of at least four phases, i.e., steering optimizing left, stability optimizing left, steering optimizing right, stability optimizing right. These four phases are distinguished in the interaction of counter 401 and comparators 406, 407. The first phase corresponds to the upward counting operation until the first threshold value, the second one refers to the maintaining of the counter reading beyond this threshold value, the third phase corresponds to a period of time before the counter reading exceeds the second threshold value, and the fourth phase refers to the duration of the counter reading beyond the other threshold value.

It will be described hereinbelow how instabilities can be detected.

One possibility includes determining the instability with respect to the rolling characteristics of several wheels of the vehicle. For example, the rolling characteristics of the wheels of one axle can be compared. More particularly, slip values of these wheels or values derived therefrom can be compared. The values of the wheels of one axle or of all axles can be compared. The wheels of the driven or the non-driven axle can be selected.

Figure 6:
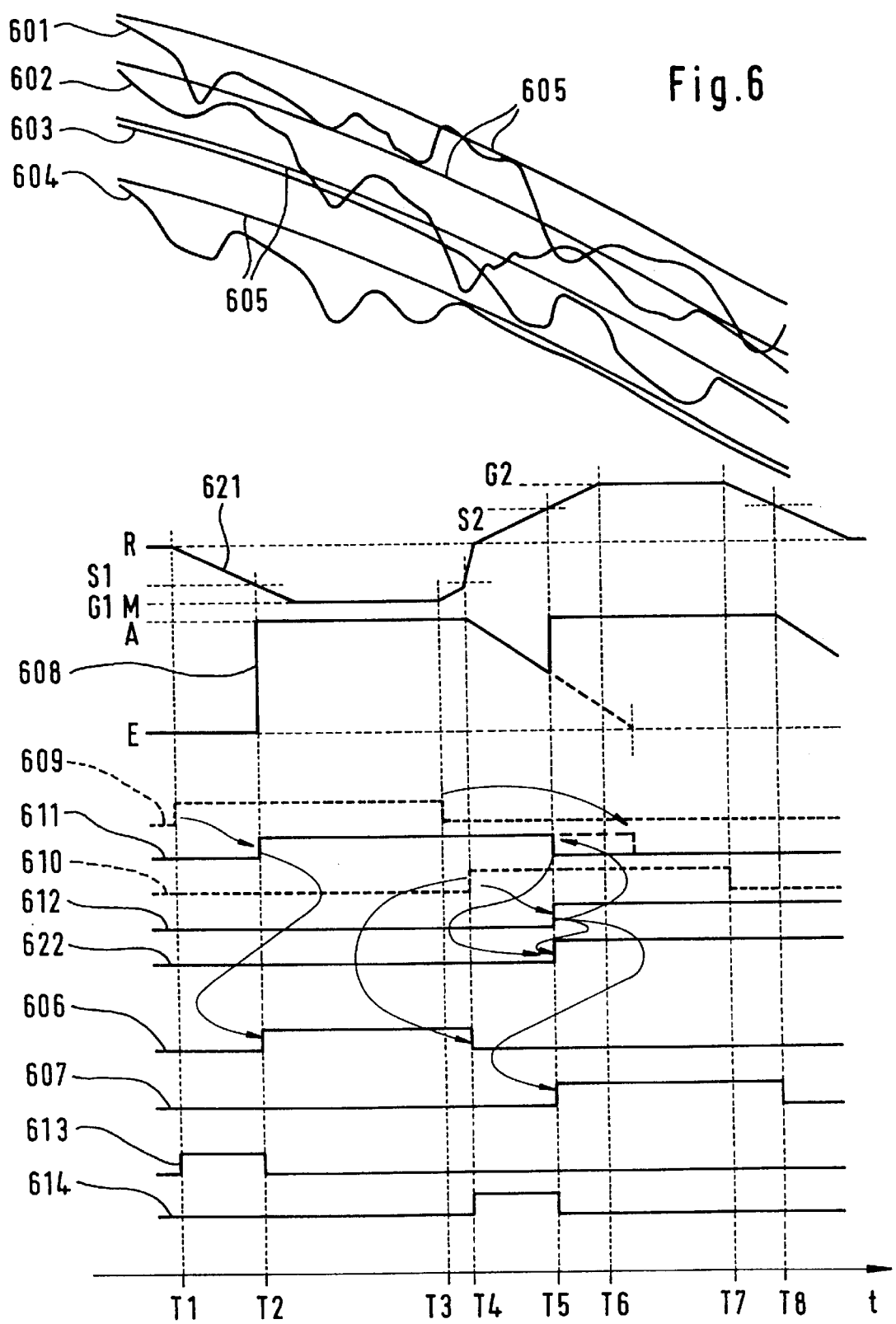
FIG. 6 are views of signal sequences which are produced and/or evaluated according to the present invention.

In FIG. 6 above, the wheel speed patterns of the four wheels of a vehicle during a lane change according to FIG. 2 are illustrated in comparison to the reference speed. Curve 605 is in each case the reference speed (which is declining due to braking). Curves 601 to 604 correspond to the wheel speeds front left, front right, rear right, and rear left. The illustrated time period corresponds to the time period of the lane change in FIG. 4. Thus, a distinction would have to be made between the above described four phases (steering aid left, stability aid left, steering aid right, stability aid right) in this time period when the above control is employed. Roughly the left half of the diagram corresponds to the left bend, the right half to the right bend. In a comparison of the slip values of the wheels on the rear axle (603 rear right, 604 rear left), for example, one can find out that in each case the outside wheel runs comparatively smoothly due to the comparatively high load because of the rolling torque, while the inside wheel is subjected to considerable slip which, under certain circumstances, are already controlled by the ABS alone. Instabilities may be inferred from the comparison of the slip values, for example (slip=differences between reference speed and wheel speed). Preferably, it is not only real time values which are compared to one another, but averaged values or values based on further processing of the slip values of the individual wheels, to the end of ruling out erroneous detections. Thus, unstable cornering maneuvers can be determined with reference to the rolling characteristics of the wheels (especially with reference to their slip behavior) by employing various criteria. The above-described actions can be preformed in the checking device 321.

Detection of a cornering maneuver may be performed in a way similar to the above description. Cornering, too, may be read from the wheel speed patterns. Thus, cornering may e.g. be principally identified when the speed patterns of the wheels of one axle differ from one another by a defined amount. The direction of the bend can be derived from the sign of the difference. In addition or instead, however, a sensor such as a steering angle sensor can be used. The components described hereinabove may be the detection device 320.

Further suitable brake assistance strategies can be provoked in case not only a braked unstable cornering maneuver is detected but also a braked unstable lane change (that is two consecutive braked unstable cornering maneuvers in different directions). To detect this condition, a gate time can be defined upon termination of a first unstable braked cornering maneuver (for example, the counter reading falls below the respective threshold value in the associated comparator). A braked unstable lane change can be identified if within this gate time a braked unstable cornering maneuver in the other direction is detected (counter reading of the counter 401 exceeds the other threshold value of the other comparator). This permits performing further suitable alterations of the braking pressures to be adjusted (for example, by changing the threshold values for ABS). In FIG. 3, the commutator 327 would select the alteration device 324 which induces appropriate measures.

Figure 4:
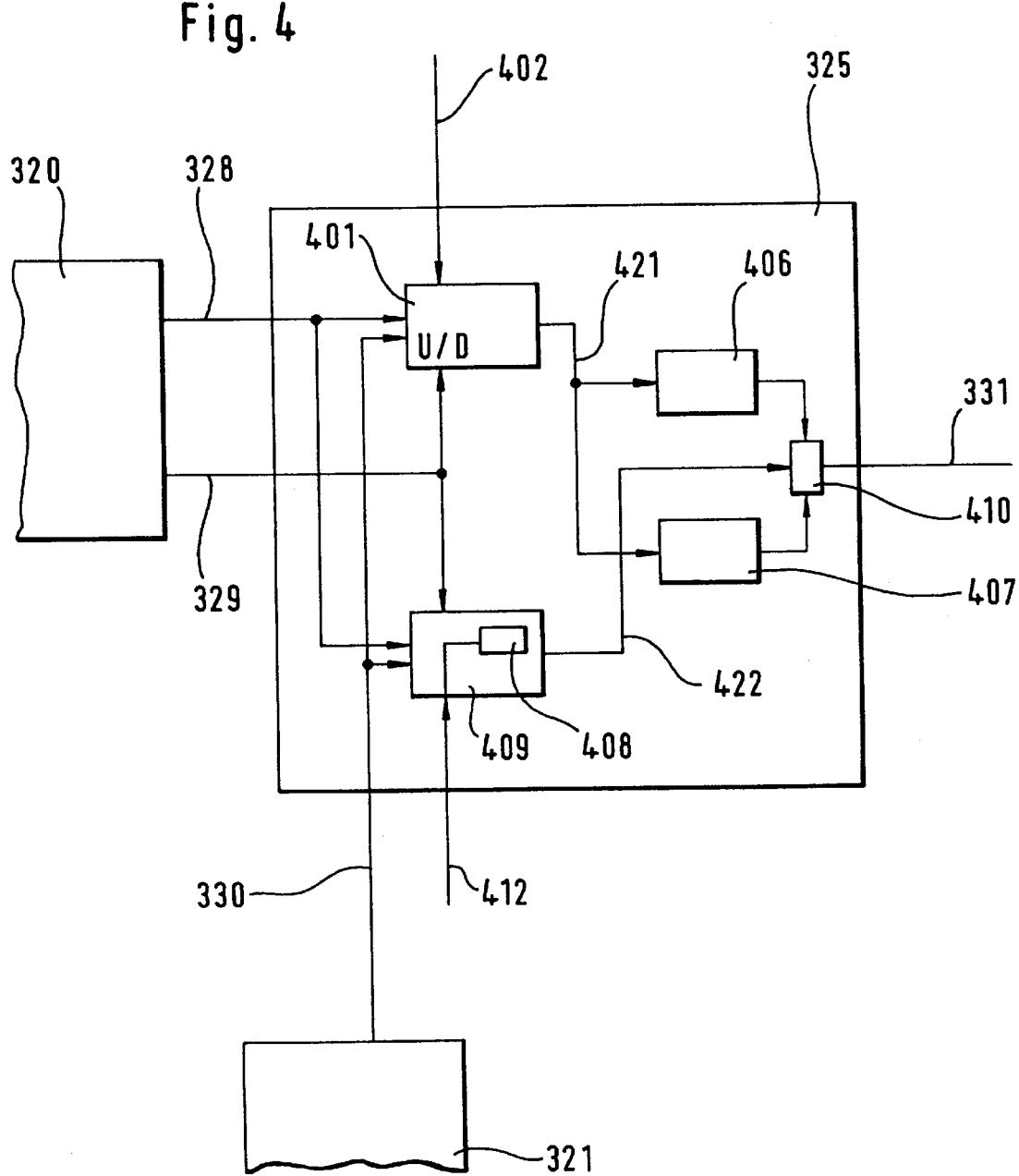
FIG. 4 shows further embodiments of the present invention.

FIG. 4 shows how the above-mentioned gate time can be implemented. A gathering device 409 with a gate time device 408 configured as a counter is provided. The counter can count from a start value to an end value. The start value is available when the first unstable braked cornering maneuver is terminated. From there on, the counter counts in the direction of the end value. When a braked unstable cornering maneuver in the other direction was detected before the end value (e.g. zero) is reached, a signal 422 can be issued which can be used as described hereinabove in order to initiate a suitable alteration of the braking pressures (for example, by way of the coordination device 410 and signal 311 to the commutator 327 in FIG. 3).

The start value of the counter of the gate time device 408 can be set according to external conditions. For example, the start value may be further remote from the end value when a lower coefficient of friction prevails (for example, on a wet road surface or slippery roadway). This takes into account the experience that the dynamic aftereffects of individual driving maneuvers on slippery road surfaces have to be taken into consideration for a longer time. When the end value is zero, for example, a first start value can be chosen on a dry road surface and a higher second start value on wet/slippery road surfaces. The end of the gate time is defined by attainment of the end value. To permit setting the start value which is responsive to the coefficient of friction, the gathering device 409 receives suitable signals by way of line 412, for example, from the signal conduit 312 in FIG. 3.

Again referring to FIG. 6, individual signals are explained as they may be produced and further evaluated according to the present invention. Reference numeral 621 represents a counter reading as it results on signal line 421 as the output of counter 401 of the determining device 325. SI represents the one threshold value for defining the threshold time period in the one direction, S2 represents the threshold value for defining the threshold time period in the other direction. The threshold values S1, S2 can, but do not have to, be equal to one another. G1 and G2 arc the respective limit values beyond which a counter will not count, not even if unstable cornering continues. R is the fixed counter reading, for example, zero.

Unstable, braked cornering is identified for the first time at time T1. Counter 401 is counted upwards (in terms of amount) until the point of time T2. The counter reading exceeds the threshold value S1 at time T2. The threshold time period is thus reached, and subsequently the braking pressure is modified so as to support stability. The counter reading drops below threshold value S1 again at time T4 so that then the stability-supporting braking pressure modification is terminated. Before this point of time, starting time T3, the counter reading is restored to the fixed counter reading. It is assumed that no more unstable condition will be detected starting time T3. If there were no more changes, the counter reading would be counted backwards to zero with the same curve as between T3 and T4. However, it is assumed in the example that a bend in the other direction is sensed starting from time T4.

Therefore, the counter reading is returned quickly to the fixed counter reading, and upward counting is performed from there on in the other direction. The threshold value S2 is reached at time T5. The other comparator will respond at that time. Subsequently, the counter is counted upwards still further until the limit value G2. At time T7, termination of unstable cornering is assumed so that the counter is restored to the fixed counter reading again starting from this time. The values drop below threshold value S2 at time T8 so that the stability-optimizing brake assistance is terminated. The counter will have adopted its fixed counter reading somewhat later.

The signals 606 and 607 may be the output signals of the comparators 406 and 407. Reference numeral 608 designates an example for the implementation of the gate time device 408. 608 indicates the counter reading of counter 408. It may be set to the initial counter reading when the respective threshold value (S1 or S2) is exceeded. When the values drop below the respective threshold values (in the direction of the fixed counter reading), counting this initial counter reading to the final counter reading is started (for example, counting downwards to zero). The gate time is then defined between the commencement and the termination of the downward counting, this means between time T4 and a time behind T6 in FIG. 6. When another unstable braking operation is detected within this gate time, a lane change can be assumed. A lane change can be indicated by a signal 622 which can prevail on line 422 in FIG. 4, for example. Suitable braking pressure alterations may be triggered thereby. For example, the braking pressure can be altered by a very steep pressure increase on the outward front wheel.

Reference character A designates the initial counter reading of counter 408 and, consequently, is an indicator of the length of the gate time. It can be variable corresponding to external conditions, for example, coefficients of friction. The length of the gate time changes thereby, with an equal counting rate. Curves 609 to 613 show various other signals which can also be produced. 609 is a signal whose presence principally indicates unstable cornering in the one direction, generally the same applies to signal 610 for a curve in the other direction. Signals 611 and 612 refer to time periods during which the stability of the vehicle is critical and is influenced at least by just this condition even after the originally critical condition has faded away. The time courses 613 and 614 refer to signals which respectively mark the period of time before reaching the threshold time during cornering in the one direction or the other direction. Thus, times T1 to T2 and T4 to T5 can be considered as steering-optimized periods and times T5 to T8 can be considered as stability-optimized periods.

Figure 5:
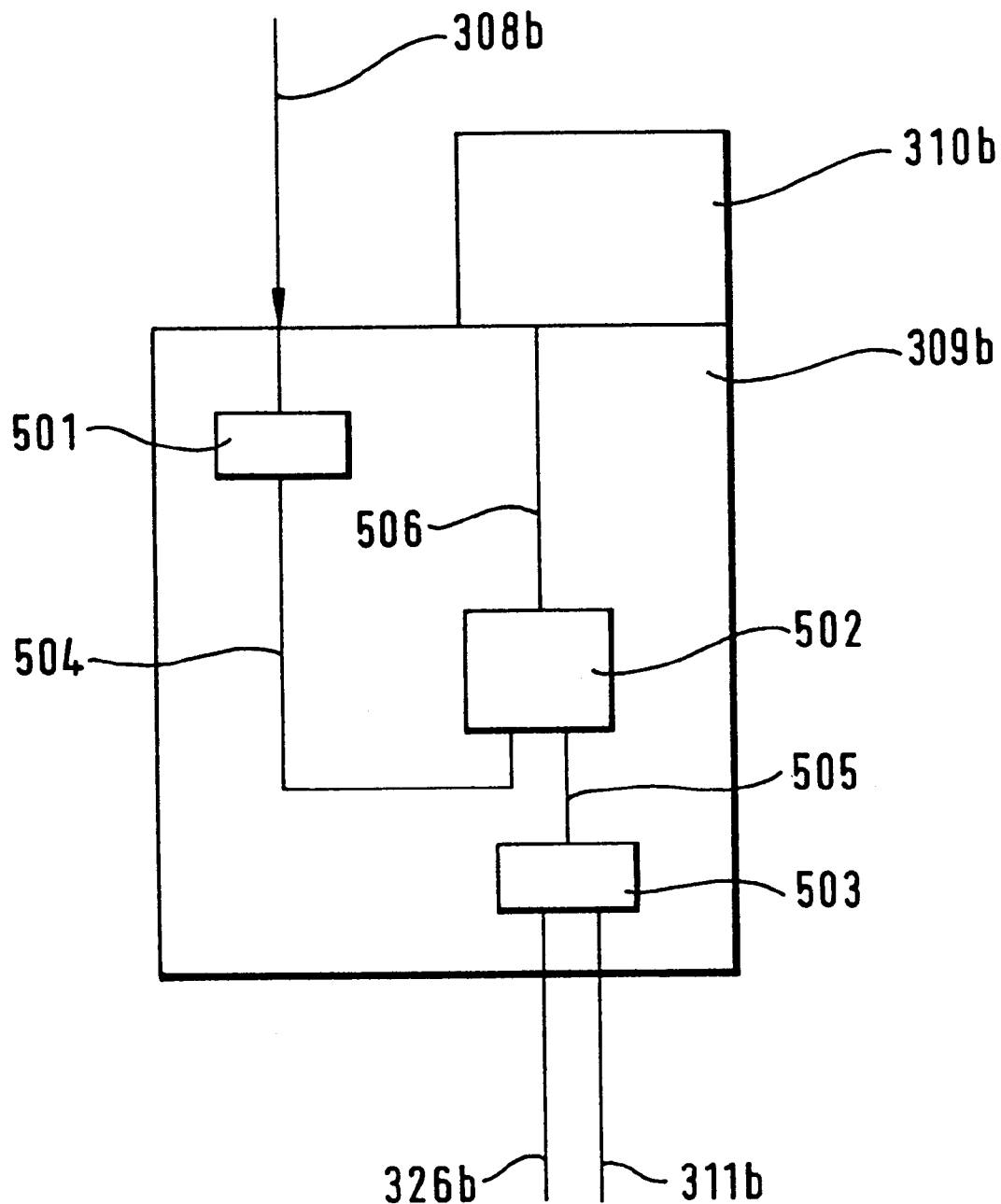
FIG. 5 is a schematic view of a component of an ABS control.

FIG. 5 shows an embodiment by way of which the deceleration-optimized influencing of braking pressure, e.g. corresponding to ABS, can be combined with the otherwise mentioned brake strategies (steering-optimizing change, stability-optimizing modification and alteration for optimizing a lane change). The component 309b is shown at the top of FIG. 3 as an example. Component 309b receives the wheel signal 308b which can be evaluated in a processing device 501, and this device may receive further signals (not shown). Signal 504 may e.g. be a signal indicative of the wheel slip or a signal indicative of the wheel speed. Reference numeral 503 designates a device which produces a preset value or nominal value. It receives signals 311b (from the signal conduit 311 in FIG. 3 above), on the one hand, and a signal 326b which can be derived from signal 326 in FIG. 3 below, on the other hand. Reference numeral 311b represents a threshold value as it would be predetermined by ABS alone, while reference numeral 326b refers to a threshold value for braking pressure adjustment which is defined according to the other braking strategies described hereinabove. The device 503 may prefer e.g. signal 326b by prioritizing if there is a signal, and otherwise select signal 311b.

The time-controlled strategies for braking pressure modification, influencing and alteration according to the present invention thus take influence on the ABS threshold values. Another strategy would imply placing ABS beside the mentioned braking strategies and adjusting the braking pressure by an appropriate prioritizing. Device 502 compares the nominal value on line 505 with the actual value on line 504 and generates one or more output signals 506 which can be used to actuate the supply or discharge valves in the valve block 310b.

What is claimed is:

1. Method of improving the driving performance of a vehicle when braking during cornering, comprising the following steps:

detecting cornering and the direction of cornering, determining the rolling characteristics of individual wheels, and if necessary, influencing the braking pressure of the brake on one wheel or on several wheels according to the rolling characteristics of these wheels, checking the driving condition of the vehicle with respect to whether instability prevails, modifying the braking pressure of at least one brake of a wheel when an instability is detected during cornering which persists beyond a predetermined time period, and identifying a critical lane change if, within a defined or definable duration after cornering in the unstable condition in one direction, there is detected cornering in the unstable condition to the other direction, and further measures are initiated upon the detection.

2. Method as claimed in claim 1, wherein the modifying is effected in such a manner that the braking pressure on at least one wheel on the inside of a bend is decreased or the braking pressure on at least one wheel on the outside of the bend is increased.

3. Method as claimed in claim 1, wherein the modifying is effected in such a manner that the braking pressures on the wheels of the rear axle are decreased.

4. Method as claimed in claim 1, wherein the modifying includes changing the braking pressure of at least one brake during cornering in the time period before the threshold time period is reached.

5. Method as claimed in claim 4, wherein the changing step further includes increasing the braking pressure on at least one wheel on the inside of a bend or decreasing the braking pressure on at least one wheel on the outside of the bend.

6. Method as claimed in claim 1, wherein the modifying step is omitted or discontinued when a countersteering maneuver or cornering in opposite direction is detected or after unstable cornering is terminated.

7. Method as claimed in claim 6, further including the step of determining the time period of instability during cornering by way of the control cycles of an ABS system.

8. Method as claimed in claim 1, further including the step of comparing signals generated from the wheels of one axle and using those signals to determine driving conditions.

9. Method as claimed in claim 8, further including inferring instability when one wheel of the axle, contrary to the other one, exhibits a considerable amount of slip, or when the braking pressure is influenced on one wheel of the axle, to a weaker extent on the other one, or is not influenced at all.

10. Method as claimed in claim 1, wherein cornering is detected by referencing the rolling characteristics of wheels of one axle.

11. Method as claimed in claim 1, wherein cornering is detected by making reference to a steering angle sensor.

12. Method as claimed in claim 1, wherein the duration is determined according to the coefficient of function between the wheel and the road surface, further including adjusting the duration upwardly as the coefficient of friction decreases.

13. Method as claimed in claim 1, wherein modifying the braking pressure includes changing the threshold values which are taken into account for influencing the braking pressure.

14. Device for improving the driving performance of a vehicle during braked cornering, including
   a detection device for detecting cornering and the direction of cornering,
   a determining device for determining the rolling characteristics of individual wheels,
   an influencing device which influences, if necessary, the braking pressure of the brake on a wheel according to the rolling characteristics of this wheel,
   a checking device for checking the driving condition of the vehicle as to whether instability prevails, and
   a modifying device for modifying the braking pressure of at least one brake of a wheel when an instability is detected during cornering over a time period that reaches a threshold time period, wherein the influencing device is an ABS system, and there is provision of a time determining device which determines the time period of the instability during cornering by way of the control cycles of the ABS system, and wherein the time determining device includes a counter with a predetermined counter value which is incremented or decremented according to the direction of the bend when unstable cornering is detected, there being provision of a top and a bottom threshold value which produce the threshold time period.

15. Device as claimed in claim 14, wherein the modifying device decreases the braking pressure on at least one wheel on the inside of a bend or increases it on at least one wheel on the outside of the bend.

16. Device as claimed in claim 14, wherein the modifying device decreases the braking pressures on the wheels of the rear axle.

17. Device as claimed in claim 14, further including a changing device which changes the braking pressure of at least one brake during cornering in the time period before the threshold time period is reached.

18. Device as claimed in claim 17, wherein the changing device increases the braking pressure on at least one wheel on the inside of a bend or decreases it on at least one wheel on the outside of the bend.

19. Device as claimed in claim 14, wherein the modifying device omits or discontinues the modification when a countersteering maneuver or cornering in the other direction is detected.

20. Device as claimed in claim 14, wherein the fixed counter reading is zero, the one threshold value is lower than zero, and the other threshold value exceeds zero.

21. Device as claimed in claim 14, wherein the counter is counted upwards or downwards until a top or a bottom limit value, the top limit value being above the top threshold value and the bottom limit value below the bottom threshold value.

22. Device as claimed in claim 14, wherein the counter is restored stepwise to the fixed counter reading when no cornering maneuver is detected.

23. Device as claimed in claim 14, wherein when a cornering maneuver in one direction is detected which is opposite to the direction that corresponds to the counter reading, the counter is quickly restored to the fixed counter reading.

24. Device as claimed in claim 14, further including:
   a gate time device which defines a gate time after the end of a critical cornering maneuver,
   a gathering device which concludes a critical lane change when a critical cornering maneuver in the other direction is detected during the gate time, and
   an alteration device which alters the braking pressure on one or more of the wheels when a critical lane change is detected.

25. Device as claimed in claim 24, wherein the gate time device includes a counter which is counted downwards from an initial counter reading, and the initial counter reading is set according to the coefficient of friction between the wheel and the road surface.

26. Device as claimed in claim 14, wherein the checking device includes a comparison device which compares data or values of the wheels of an axle.

27. Device as claimed in claim 14, wherein the detection device includes a comparison device which compares data or values of the wheels of an axle.

28. Device as claimed in claim 14, wherein at least one of the modifying device, the changing device, and the alteration device includes a device for changing the threshold values which are taken into account for influencing the braking pressure.

* * * * *

UNITED STATES PATENT AND TRADEMARK OFFICE
CERTIFICATE OF CORRECTION

PATENT NO. : 6,273,529 B1  
DATED : August 14, 2001  
INVENTOR(S) : Jurgen Woywod, Dirk Waldbauer and Georg Roll Page 1 of 1

It is certified that error appears in the above-identified patent and that said Letters Patent is hereby corrected as shown below:

Column 11,  
Line 16, change "coefficient of function" to -- coefficient of friction --.

Signed and Sealed this

Thirtieth Day of April, 2002

Attest:

JAMES E. ROGAN  
Attesting Officer  
Director of the United States Patent and Trademark Office